W. A. WOOD.
Harvester-Rake.

No. 220,952. Patented Oct. 28, 1879.

Witnesses.
F. L. Ouvand
Alexander Mahon

Inventor.
Wm Anson Wood
by A. M. Smith
Attorney.

UNITED STATES PATENT OFFICE.

WILLIAM ANSON WOOD, OF ALBANY, NEW YORK, ASSIGNOR TO FRANK WOOD, OF SAME PLACE.

IMPROVEMENT IN HARVESTER-RAKES.

Specification forming part of Letters Patent No. 220,952, dated October 28, 1879; application filed May 21, 1879.

*To all whom it may concern:*

Be it known that I, WILLIAM ANSON WOOD, of Albany, county of Albany, State of New York, have invented certain new and useful Improvements in Harvester-Rakes, of which the following is a full, clear, and exact description, reference being had to the accompanying drawings, making part of this specification, in which—

Figure 1:
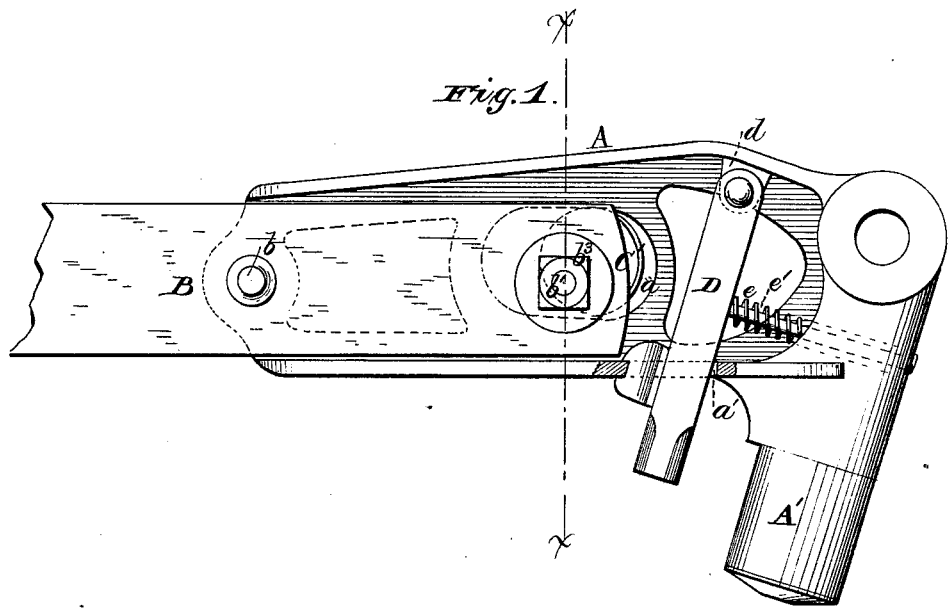
Figure 5:
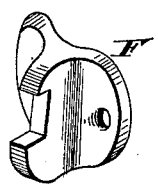
Figure 3:
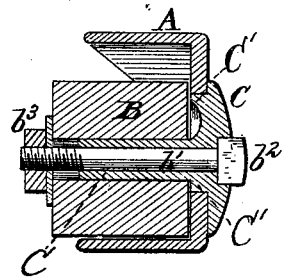
Figure 4:
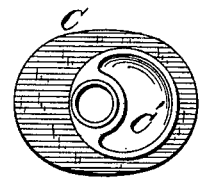
Figure 2:
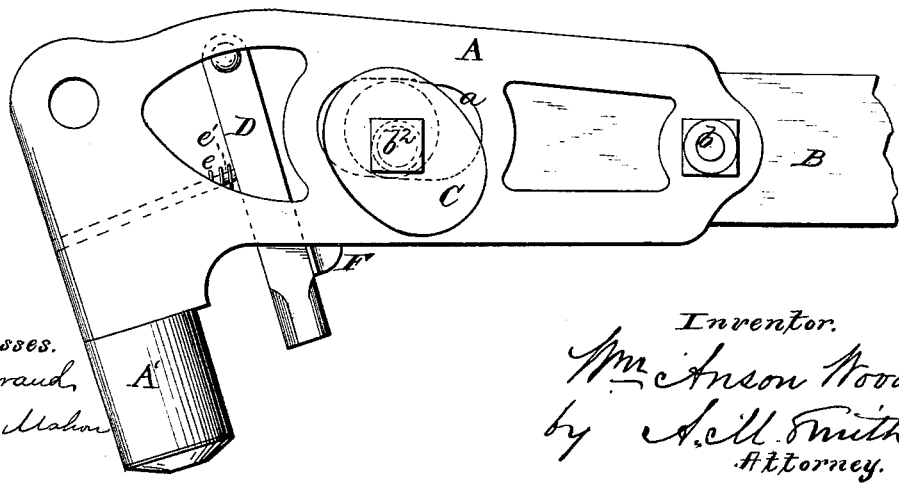

Figure 1 is a side elevation of the heel end of a rake and reel arm, showing my improvements. Fig. 2 is a similar view, taken from the reverse side of the arm. Fig. 3 is a section, taken on line $x$ $x$, Fig. 1; and Figs. 4 and 5 represent detached views of parts hereinafter described.

Similar letters of reference denote corresponding parts wherever used.

The invention has for its object the improvement of the combined rake and reel described in Letters Patent granted to me February 20, 1877, No. 187,575; and it consists, first, in a novel means for effecting the adjustment of the rake-arm in its socket-piece or elbow for changing the working relation of the rake to the grain and grain-platform; and, secondly, to a novel means applied to the rake and reel arms or socket-pieces for changing the reel or gathering arms to rake-arms, and vice versa, as hereinafter described.

The rake and reel and the cam for controlling the same in their general arrangement may be similar to those embraced in the patent above referred to, a portion of the cam-track being made movable for actuating a switch or gate, said movable portion and the switch together serving to control the path of the rake and reel arms, and causing them to act simply as reel or gathering arms, or as rakes, as required, the movable track and switch in turn being automatically controlled by devices applied to said arms, while at the same time they are adapted to be controlled by the attendant on the machine, as explained in the patent named.

In the accompanying drawings, A represents the socket-piece or elbow, provided with friction-roller A'; which travels in the cam-groove. B is the rake-arm, secured in the socket-piece A by means of a pivotal through-bolt, at $b$, near the outer end of the socket. The side wall of the socket, near its inner or heel end, is slotted at $a$, and a headed sleeve, C, passes through the slot $a$, and through, or nearly through, a perforation in the inner end of the rake-arm B, and a through-bolt, $b'$, passing through the sleeve C, serves, in connection with the head on the sleeve, to clamp the said inner end to its socket-piece. The sleeve C on the end adjacent the head is provided with an eccentric, $C'$, which fits within the slot $a$, and serves, when rotated, to vibrate the sleeve, and with it the inner end of the rake-arm, on the pivotal bolt $b$ as a center, moving the latter up or down in its socket, and thus vibrating the outer end of the arm, to which the rake-head is attached, for setting the latter nearer to or farther away from the platform, as the nature of the work or the condition of the grain may require.

The head $b^2$ of the bolt $b'$ is squared and fits within a squared socket in the head of sleeve C in such manner that when the nut $b^3$ is loosened, by applying a wrench to the head $b^2$ and rotating said head, the cam $C'$ will be rotated with it, effecting the adjustment of the rake-arm, as desired.

A space is left in the socket at the inner end of the arm B, and within this space is arranged a pendent arm, D, pivoted at its upper end to a lug, $d$, on the socket-piece, its lower end passing down through a slot, $a'$, in the lower wall of the socket, as shown. Behind the arm D and within the heel end of the socket is a spring, $e$, arranged, by preference, upon a guide or steadying pin, $e'$, secured in the heel of the socket-piece, the tension of the spring serving to hold the arm D at the outer end of the socket $a'$. The pendent arm D projects below the socket-piece, and when held out or forward by the spring, as explained, it passes outside of the weighted or yielding portion of the cam-track described in the patent referred to, and does not operate the same; consequently the arm to which it is applied acts as a rake-arm; but if, for any reason, is is desired to make it a gathering-arm or reel-beater only, the pendant D is forced inward, overcoming the tension of spring, and is locked at the inner end of its slot $a'$ by a block or button, F, as shown in Figs. 1 and 2. (See also Fig. 5.) In this position the pin or pendent arm D moves directly over and rests upon the yielding or weighted portion of the track, and the weight of the rake-arm to which it is applied serves to depress said yielding portion of the track, bringing the switch or gate into place for changing the path of the roller on the rake-arm, and thereby causing said arm, after gathering in the grain, to rise and pass over it, leaving it upon the platform.

While the block or button remains in place, as described, the arms to which they are applied will act permanently and automatically as beater-arms, the removal of the block causing them to again resume the function of rake-arms.

In lieu of the blocks or buttons, a trip may be employed, placed under the control of the attendant on the machine, for forcing the pendent arms D inward and causing the rake-arms to act as beaters.

Having now described my invention, what I claim as new, and desire to secure by Letters Patent, is—

1. The rake-arm pivoted in its socket or elbow piece, in combination with the cam or eccentric for adjusting the arm and rake-head or beater, substantially as described.

2. The rake-arm provided with the pivoted pendant D and spring for causing the arm to which it is attached to act as a rake-arm, in combination with means, substantially as described, for adjusting said pendant laterally, overcoming the tension of the spring, and causing said arm to act as a beater or gathering arm only.

WM. ANSON WOOD.

Witnesses:
A. L. ANDREWS,
O. H. SHEPARD.